(12) United States Patent
Laurent et al.

(10) Patent No.: US 6,714,283 B2
(45) Date of Patent: Mar. 30, 2004

(54) SENSOR AND METHOD FOR RANGE MEASUREMENTS USING A TDI DEVICE

(75) Inventors: John Laurent, Saint-Augustin-de-Desmaures (CA); Denis Boulanger, Ste-Foy (CA)

(73) Assignee: Institut National d'Optique, Quebec (CA)

( * ) Notice: Subject to any disclaimer, the term of this patent is extended or adjusted under 35 U.S.C. 154(b) by 0 days.

(21) Appl. No.: 10/115,162

(22) Filed: Apr. 2, 2002

(65) Prior Publication Data

US 2003/0184726 A1 Oct. 2, 2003

(51) Int. Cl.[7] .............................. G01C 3/00; G01C 3/08; G01N 21/00; H01L 27/00; H04N 3/14
(52) U.S. Cl. ................ 356/3.07; 356/237.1; 250/208.1; 348/295
(58) Field of Search ................................ 356/3.06, 3.07, 356/237.1–237.6, 238.1–241.6; 348/295; 250/208.1

(56) References Cited

U.S. PATENT DOCUMENTS

| | | | |
|---|---|---|---|
| 5,434,629 A | * | 7/1995 | Pearson et al. ............. 348/721 |
| 5,585,652 A | * | 12/1996 | Kamasz et al. ............. 257/231 |
| 5,604,534 A | * | 2/1997 | Hedges et al. ............. 348/144 |
| 5,703,639 A | * | 12/1997 | Farrier et al. ............... 348/241 |

* cited by examiner

*Primary Examiner*—Thomas H. Tarcza
*Assistant Examiner*—Brian K Andrea
(74) *Attorney, Agent, or Firm*—Merchant & Gould P.C.

(57) ABSTRACT

A sensor and method for taking range measurements of a target object using a TDI device as a detector are provided. The device is positioned to detect reflections of a structured light beam on the target object. To avoid losing the range information in the TDI process, the exposition of the device to the reflection of the light beam is restricted to the first integration period of the acquisition cycle of the TDI device, so that the output of the device provides line by line an image of the light beam on the target object during this first integration period.

15 Claims, 4 Drawing Sheets

SENSOR AND METHOD FOR RANGE MEASUREMENTS USING A TDI DEVICE

FIELD OF THE INVENTION

The present invention relates to 3-D sensing and more particularly concerns a sensor and a method for making range measurements using a TDI array.

BACKGROUND OF THE INVENTION

In the field of information sensing, machine vision technologies provide valuable information about the environment and about specific objects of interest through close inspection. Many known 3-D data acquisition systems exist that use 3-D sensors based on the triangulation principle. In such systems, a specific known and often fixed pattern of illumination, i.e. structured illumination, is projected from a laser onto an object to be measured. A digital camera, generally based on a charge coupled device (CCD) matrix array, is placed at a known fixed and oblique angle with respect to the light projector. The intersection between the emitted light pattern and the field of view of the digital camera defines the operating range of the 3-D sensor. The position of the illuminated points on the object surface that are imaged on the detector can be computed trigonometrically in order to obtain the sensor/object distance to these points. These point distance measurements are also called range points.

FIG. 1 (prior art) shows such a triangulation based 3-D sensor often called a laser profilometer, where the structured light pattern projected is a laser line. Such profilometers analyze the deformations of the laser line on the object in order to evaluate the depth or range (z-axis) as well as the horizontal position (x-axis) of the object. Generally, the translation of either the profilometer or the object to be scanned by the means of a translation device, often coupled to an encoder, allows the system to obtain the missing (y-axis) position. Consequently, a complete 3-D set of points of the object's surface can be acquired.

The above-described system is widely used in industrial environments where the objects to be scanned are in the process of being conveyed. In such a scenario, the translation mechanism is the conveyor, usually coupled to an encoder which measures the displacement and speed of the conveyor.

One drawback of existing cameras available for range and 3-D measurements is that manufacturers usually provide such cameras in a limited amount of shapes and sizes. State of the art commercially available 2-D matrix sensors typically have arrays of 640×480 pixels, which operate at 30 frames per second. This allows the extraction, based on a triangulation setup with a laser line projector, of a 3-D profile of 640 points at 30 Hz. With partial scanning and using a quad-speed camera, 640 point profiles at 350 Hz are possible, and, using specialized high frame rate cameras, 256 point profiles at 900 Hz may be achieved. If high lateral resolution, that is points per profile, is desired (ex: 2048 points per profile), very expensive and slow (maximum frame rate of 30 Hz) 2048×2048 arrays need to be used.

Long detectors are however available in the 2-D imaging industry in the form of TDI devices. The Time Delayed Integration (TDI) principle is a technique used for increasing the sensitivity of standard line array cameras through the use of multiple integration lines or stages (present state of the art allows 96 integration stages). Such a principle of operation can only be applied for imaging moving objects, when the motion of the object is known or can be measured and when the motion of the object is perpendicular to the integration lines of the photodetector array. These conditions are necessary so that the object displacement can be synchronized with the camera's integration stages. In such a scenario, as the object to be imaged approaches the first line of pixels (first integration stage) of the TDI camera's photodetector array, this stage "sees" the object for a short time period and thus integrates during this time period the image of the corresponding linear portion on the object. As the object moves forward the second integration stage now "sees" the same linear object portion that the first stage just imaged. The light equivalent electronic charges integrated by the first stage are then transferred to the second stage and the second stage can now integrate the image of the same linear portion of the object for another short time period. This process is then repeated as the object moves in front of all the integration lines. The line image that is thus outputted from the image sensor is thus equivalent to the sum of all the integration stages. For example, a widely available type of TDI array has 2048 pixels wide photodetectors and has 96 integration stages, which correspond to 96 lines of 2048 pixels on the detector. With this detector, the image that is outputted line by line corresponds to the sum of the 96 previous integration periods.

In an industrial conveyor and web inspection setting, time delayed integration (TDI) cameras are often used for imaging, line by line, objects or materials as they move at high speeds down production lines. These cameras are used because the multiple integration lines on the CCD give these cameras much improved light sensitivity, which is very important when short integration times are necessary for the imaging of the fast moving objects. Also, for industrial applications, it is possible to place the TDI camera perpendicular to the object motion and to synchronize the integration stages with the object displacement using encoders.

While TDI cameras are frequently used for imaging in web type industrial inspection applications, to date, they have not been used as the detection means for range sensors. While it seems that a TDI line array can readily replace traditional line array detectors commonly used as detection means for single point type laser and flying spot laser scanning 3-D sensors, this in fact has not been the case. One reason is that the performance gain, in terms of speed or resolution of these types of 3-D sensors, would not be increased by the use of a TDI sensor and with the added difficulty of synchronizing the motion of the object with the sensor, manufacturers have not adopted this approach. For 3-D sensors such as laser profiling sensors that use 2-D matrix type photodetector arrays it might even seem impossible to use a TDI type detector array as a detection means because, for such a sensor, the information necessary to determine the position (elevation) of the incident light reflected from the object surface and imaged on the detector matrix is eliminated as the TDI sensor proceeds through its integration procedure.

There is therefore a need for an apparatus and method allowing the use of a TDI array for range 3-D applications.

OBJECTS AND SUMMARY OF THE INVENTION

It is an object of the present invention to provide a sensor adapted to obtain range points of a target object using a TDI device.

It is a further object of the present invention to provide a method for range measurements of a target object using a TDI array.

It is a preferable object of the present invention to provide such a sensor and such a method adapted for industrial applications.

Accordingly, a first aspect of the present invention provides a sensor for measuring a range to a target object by triangulation, using a TDI device.

The sensor first includes a light source, which generates a light beam for projection towards the target objet and for reflection thereon. A plurality of photodetector arrays, defining the TDI device, are disposed contiguously in a linear sequence, the TDI device being positioned to detect the reflection of the light beam on the target object across a plurality of these photodetector arrays.

The TDI device is operable over an acquisition cycle composed of a number of integration periods. Each photodetector array accumulates electronic charges representative of light incident thereon during each integration period. Each of the photodetector arrays transfers all electronic charges therein to a next photodetector array along the linear sequence after each integration period. The TDI device has an output for transmitting all electronic charges from a last photodetector array along the linear sequence after each integration period.

The sensor also includes restricting means for restricting an exposition of the TDI device to the reflection of the light beam on the target object to a selected integration period of the acquisition cycle.

Finally, processing means are provided for receiving the electronic charges from the output of the TDI device after each integration period of the acquisition cycle, and processing the electronic charges of the acquisition cycle to obtain therefrom the range to the target object.

In accordance with a second aspect of the present invention, there is provided a sensing apparatus for measuring a range to a target object over a plurality of regions thereof by triangulation, using a TDI device.

The sensing apparatus includes a light source generating a light beam for projection towards an exposition area, and positioning means for successively positioning each of the regions of the target object within this exposition area.

A plurality of photodetector arrays are provided and disposed contiguously in a linear sequence, these photodetector arrays defining the TDI device. The TDI device is positioned to detect the reflection of the light beam on a region of the target object, which extends in the exposition area across a plurality of the photodetector arrays. The TDI device is operable over a plurality of acquisition cycles, each composed of a number of integration periods. Each photodetector array accumulates electronic charges representative of light incident thereon during each integration period, and each of said photodetector arrays transfers all electronic charges therein to a next photodetector array along the linear sequence after each integration period. The TDI device has an output for transmitting all electronic charges from a last photodetector array along the linear sequence after each integration period.

The sensing apparatus also includes restricting means for restricting an exposition of the TDI device to the reflection of the light beam on each region of the target object to a selected integration period of each acquisition cycle. Processing means are also provided for receiving the electronic charges from the output of the TDI device after each integration period of each acquisition cycle, and processing the electronic charges of each acquisition cycle to obtain therefrom the range to the region of the target object during the selected integration period of the acquisition cycle.

In accordance with another aspect of the invention, there is also provided a method for measuring by triangulation a range to a target object extending in an exposition area using a TDI device. This method includes the following steps:

a) generating a light beam, and projecting this light beam towards the exposition area for reflection on the target object;

b) disposing a plurality of detector arrays, defining said TDI device, contiguously in a linear sequence, the TDI device being positioned to detect the reflection of the light beam on the target object within the exposition area across a plurality of the photodetector arrays. The TDI device has, in operation, an acquisition cycle composed of a number of integration periods, each photodetector array accumulating electronic charges representative of light incident thereon during each integration period. Each of the photodetector arrays transfers all electronic charges therein to a next photodetector array along the linear sequence after each integration period. The TDI device has an output for transmitting all electronic charges from a last photodetector array along the linear sequence after each integration period;

c) restricting an exposition of the TDI device to the reflection of the light beam on the target object to a selected integration period of the exposition cycle; and d) receiving the electronic charges from the output of the TDI device after each integration period of the acquisition cycle and processing the electronic charges of the acquisition cycle to obtain therefrom the range to the target object.

The present invention also provides, in accordance with yet another aspect thereof, a method for measuring by triangulation a range to a target object over a plurality of regions thereof using a TDI device, comprising the steps of:

a) generating a light beam and projecting the same towards an exposition area;

b) successively positioning each of the regions of said target object within the exposition area;

c) disposing a plurality of detector arrays, defining said TDI device, contiguously in a linear sequence, said TDI device being positioned to detect the reflection of the light beam on the region of the target object within the exposition area across a plurality of the photodetector arrays, said TDI device having, in operation, a plurality of acquisition cycles each composed of a number of integration periods, each photodetector array accumulating electronic charges representative of light incident thereon during each integration period, each of said photodetector arrays transferring all electronic charges therein to a next photodetector array along said linear sequence after each integration period, said TDI device having an output for transmitting all electronic charges from a last photodetector array along said linear sequence after each integration period of each acquisition cycle;

d) restricting an exposition of the TDI device to the reflection of the light beam on each region of the target object to a selected integration period of a corresponding acquisition cycle; and e) receiving the electronic charges from the output of the TDI device after each integration period of each acquisition cycle and processing the electronic charges each of the acquisition cycle to obtain therefrom the range to the corresponding region of the target object.

Advantageously, the use of a TDI device in the place of matrix type photodetector arrays as detection means for 3-D triangulation based sensors allows certain performance gains. The main performance gain is in the number of 3D points per profile combined with a high profile rate that can be achieved using these detectors. Using relatively inexpensive and standard commercially available TDI devices in accordance with the present invention, it is possible to obtain a 3-D profile of 2048 points at a rate of 864 Hz. and using the partial scanning technique described below, 2048 points at a rate of 1728 Hz can be achieved.

Further advantages and features of the present invention will be better understood upon reading of preferred embodiments thereof with reference to the appended drawings.

DESCRIPTION OF PREFERRED
EMBODIMENTS OF THE INVENTION

Figure 1:
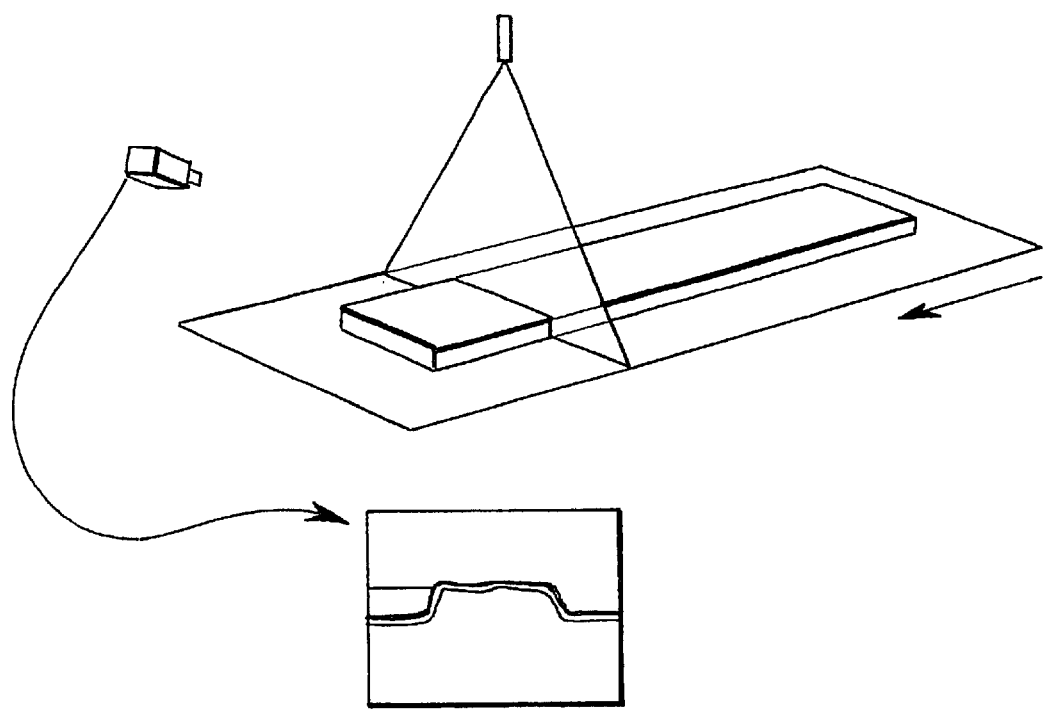
FIG. 1 (PRIOR ART) is a perspective view of a sensor according to prior art, illustrating the principle of range measurements using a laser profiling system coupled to a translation device.
Figure 2:
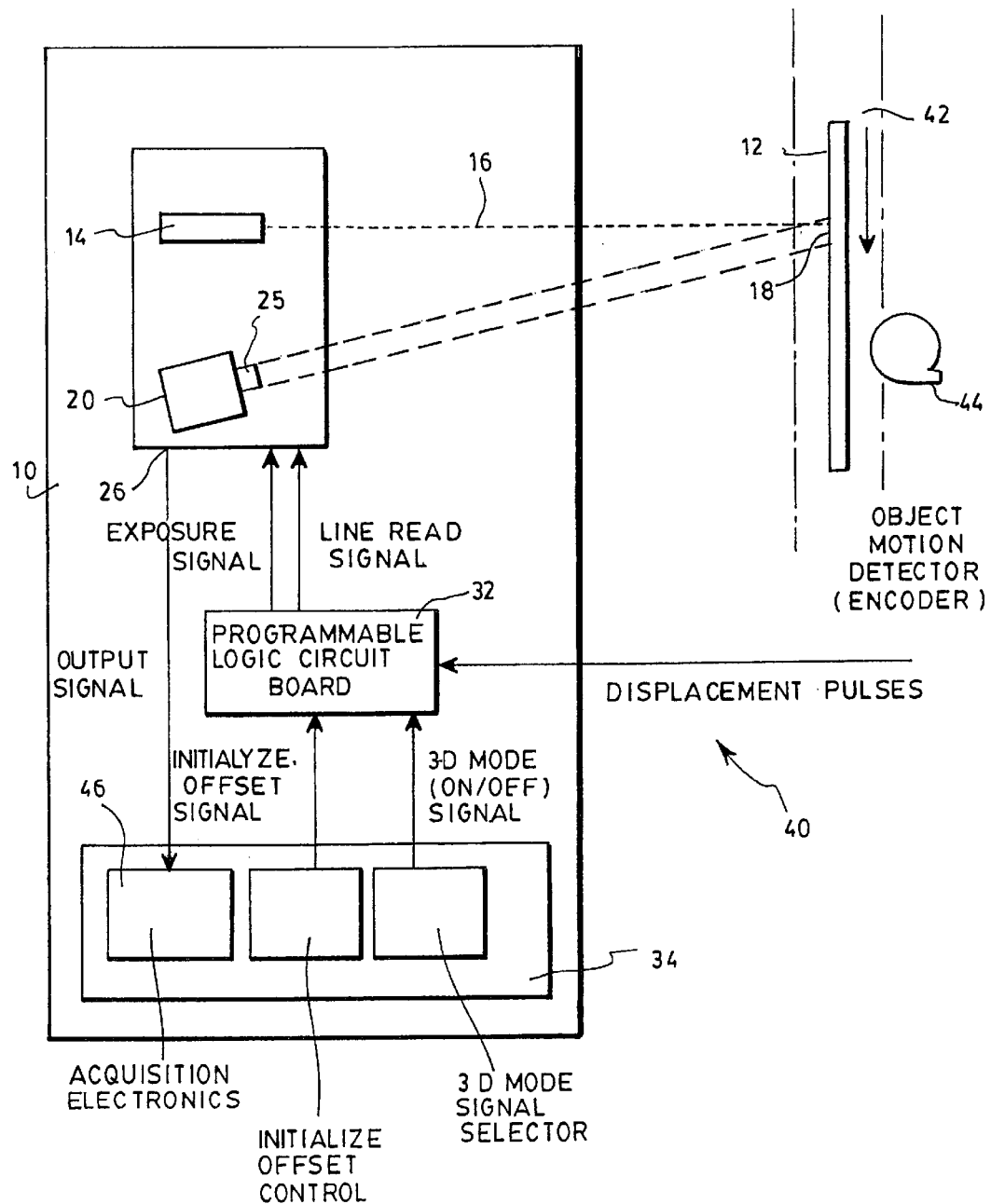
FIG. 2 is a schematic representation of a sensing apparatus according to a preferred embodiment of the present invention.

With reference to FIG. 2, there is shown a preferred embodiment of a sensor 10 for measuring the range to a target object 12.

The sensor first includes a light source 14 generating a light beam 16. In the preferred embodiment, the light source 14 is a uniform intensity laser line projector, the light beam 16 therefore being line-shaped. For the purposes of the invention, the light beam should be structured, that is that it should define a pattern. The light beam 16 is projected towards an exposition area 18 on the target object 12, and reflected by this object. The shape of the reflected light beam will help determine the range of the surface of the object 16 along the pattern defined by the light beam 16.

A TDI device 20 is provided and positioned to detect the reflection of the light beam 16 on the target object 12 within the exposition area 18. A camera lens 25 is preferably provided to image the reflection of the light beam 16 on the appropriate optical components of the TDI device 20.

Figure 4:
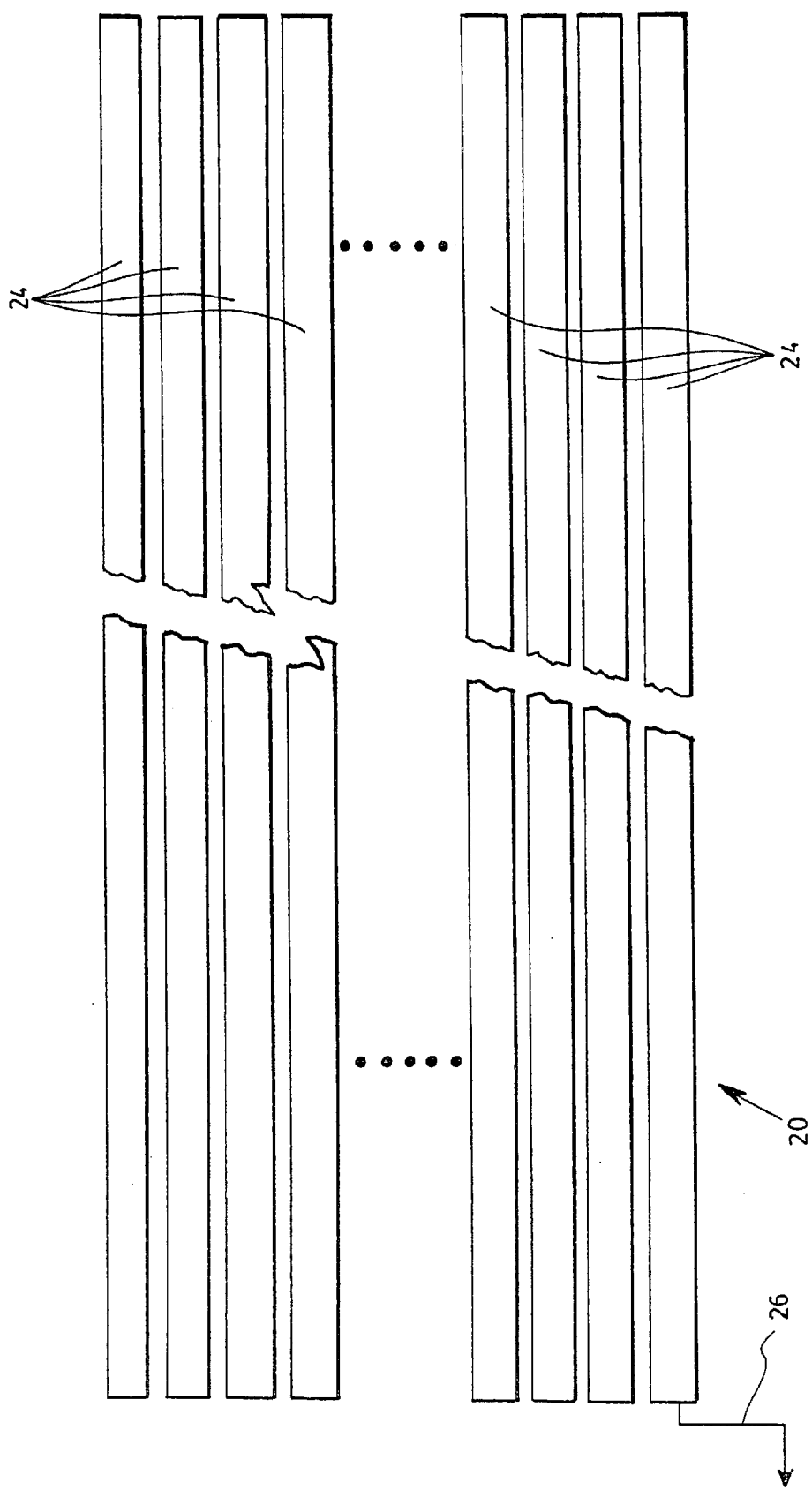
FIG. 4 is a schematic representation of a TDI device.

Referring to FIG. 4, there is illustrated the structure of a TDI device 20 in accordance with a preferred embodiment of the present invention. The TDI device 20 preferably has a plurality of line photodetector arrays 24 extending in a linear sequence. In a particularly advantageous embodiment of the invention, the TDI includes 96 photodetectors each 2048 pixels long. In operation The TDI device 20 has an acquisition cycle composed of a number of integration periods, corresponding to the number of photodetector arrays 24 used for the purposes of the invention. In practice, one may used all of the photodetector arrays 24 of a given TDI device within a n acquisition cycle, but alternatively only a portion of the actual device, and therefore a smaller number of photodetector arrays, may be used if a detector of a smaller effective width 30 is desired. It is therefore understood that the expression "TDI device" used herein refers not to the entire physical device, but to the selected number of successive photodetector arrays 24 used for the purposes of the invention.

The operation principle is the following: each photodetector array 24 accumulates electronic charges during each integration period, these electronic charges being representative of all light incident on this particular array 24. The photodetector array 24 then transfers these electronic charges, in addition to all electronic charges having been previously transferred therein, to the next photodetector array 24 along the linear sequence before the next integration period. As explained above, For the standard use of the TDI device, it is combined with a device translating the object in synchronization with the integration periods, which allows the TDI device to integrate multiple exposures of a same region of the target object. The device 20 has an output 26, which transmits all electronic charges accumulated therein out of the device after each integration period. The signal at the output therefore corresponds to the integration of the electronic charges successively detected by the previous photodetector arrays of the linear sequence during all previous integration periods of the acquisition cycle.

Referring again to FIG. 2, the sensor 10 also includes restricting means for restricting the exposition of the TDI device 20 to the reflection of the light beam 16 on the target object to the first integration period of the acquisition cycle. Preferably, the restricting means are embodied by a pulse generator, pulsing the light beam 16 into a light pulse having a duration of one integration period, and a synchronizing circuit synchronizing the light pulse with the first integration period of the exposition cycle. In the illustrated embodiment, both of these components are integral to a programmable logic circuit board 32. Other possible embodiment for the restricting means include a modulated light source, or a shutter mechanism of any appropriate type such as electronic, mechanical or liquid crystal, located in front of the TDI device 20. A shutter mechanism would be particularly advantageous in the case where the background illumination is too high, to avoid saturation of the photodetector arrays 24 during the integration periods when no data is to be collected. Combinations of all the embodiments of restricting means described above could also be used depending on the particular sensing conditions.

As will be understood by one skilled in the art, restriction of the exposition of the TDI device to only the first integration period will have the result that each set of electronic charges provided by the output 26 of the detector 20 will correspond to the exposition of a single photodetector array 24 to the light reflected by the target object 12. In this manner the output 26 will provide, over a given acquisition cycle, an image of the light beam reflected on the target object, line by line.

A processor 34 is also provided for receiving the electronic charges from the output of the TDI device 20, and processing these electronic charges over the acquisition cycle to obtain the range to the target object. Once the image of the reflection of the light beam on the target object has been obtain, the data processing can be done by standard techniques used for prior art triangulation based sensors.

The sensor according to the invention may also be combined in a sensing apparatus 40 with positioning means successively positioning different regions of the target object within the exposition area of the sensor 10, thereby allowing to take successive range measurements for these different regions of the target object. A conveyor or any other device apt to displace the particular object being scanned may embody the moving means. In such an embodiment, the detector is operated over a plurality of cycles, in synchronization with the pulses of the light beam. Preferably, an optical encoder 44 monitors the moving of the target object, and is coupled to the sensor 10 for also synchronizing the first integration period of each acquisition cycle with the positioning of one of the regions of the target object within the exposition area. It should be noted that with the exception of the provision of restricting means, the set-up according to this embodiment is similar to a regular 2-D imaging apparatus using a TDI device. It is therefore a very advantageous aspect of the present invention that the restricting means may be deactivated in order to readily transform the apparatus into a 2-D sensing device.

Still referring to FIG. 2, there is shown a sensing apparatus 40 according to a preferred embodiment of the invention. With this apparatus, a control sequence can be implemented as follows. First, the encoder pulses, which measure the object displacement, are used to control the TDI integration periods timing. For every N number of pulses from the encoder, a line integration period is commanded. This sequence orders the transfer of charges of each integration stage to its next sequence neighbor and causes the final integration line to output a line image to the acquisition electronics 46 of the processor 34. If 3-D measurements are desired, the exposure signal, which causes the pulsing of the structured light pattern projector, is activated only once at the beginning of each of the line integration periods. In the normal 2-D line-imaging mode of the TDI array, the exposure signal is activated once for every one of the integration periods. In a preferred embodiment, the acquisition electronics includes an electronic image acquisition card, and the processing means are preferably embodied by a microcomputer. Alternatively, a single electronic image acquisition and processing card with an integrated on-board general-purpose processor or DSP may embody both components. The processing means is then used for processing the image data and to establish the position of the projected light imaged on the detector in order to extract the laser profile and to determine the range to the object surface.

Figure 3:
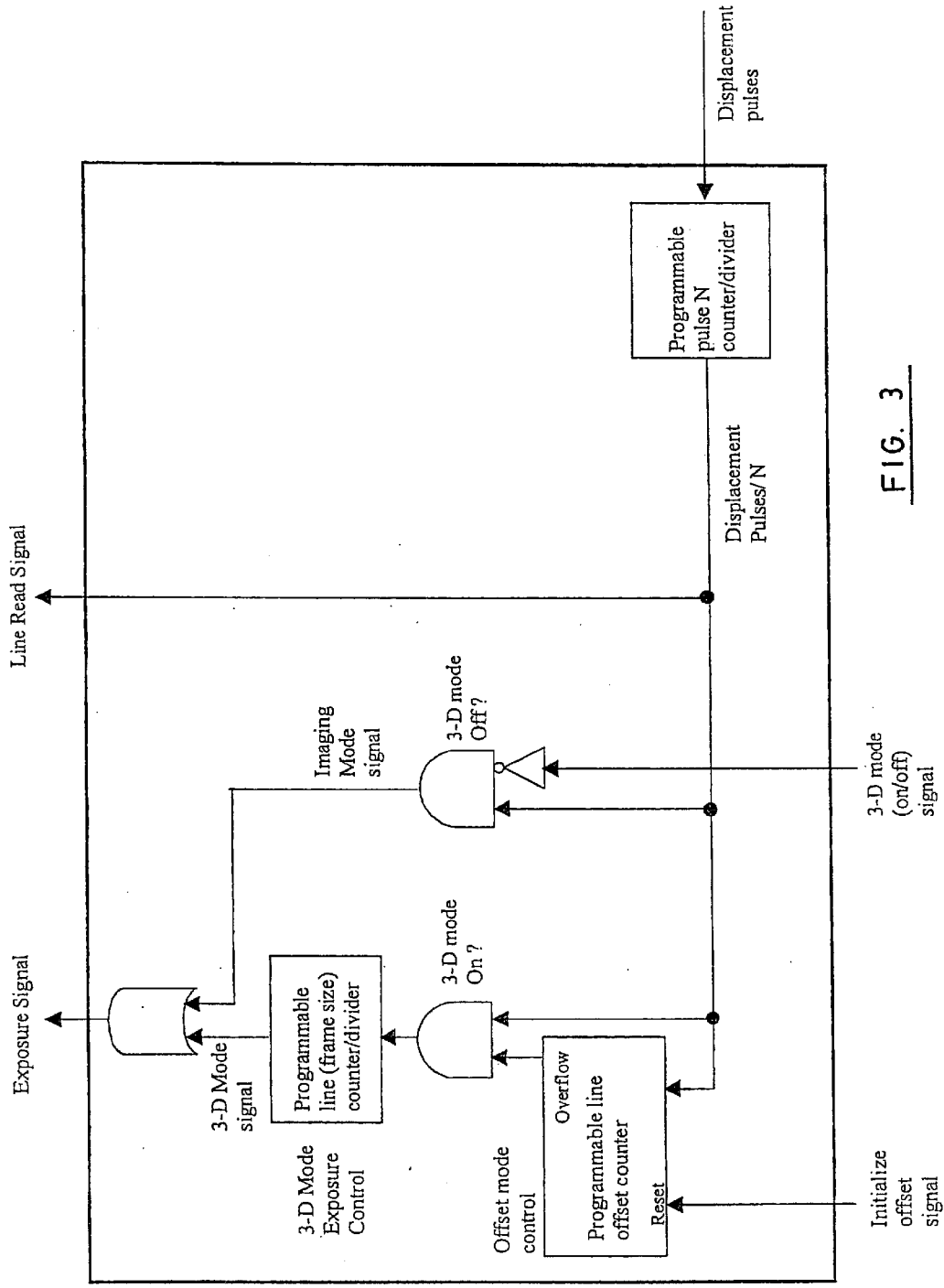
FIG. 3 is a schematic representation of a programmable logic circuit board for use in the sensing apparatus of FIG. 2.

Referring to FIG. 3, there is shown how the logic of the high-level control signals can be implemented in accordance with a preferred embodiment of the present invention. Included in the logic schema are two elements that can be used to implement the partial scanning of the TDI device integration lines and to program an offset of the partially scanned area. The inputs to the control logic are the displacement pulses from the encoder, the 3-D mode selection signal, and the initialize offset signal. The displacement pulses are fed into a programmable counter which serves to divide the pulses by N (N being set by the user) so that the output is a pulse sequence of N displacement pulses. The value N is set so that N displacement pulses of the object correspond to a displacement of the object's image on the TDI device that is equivalent to a single integration line. The 3-D mode selection signal is a binary (On/Off) type control line that allows the sensor to switch between the 3-D mode and the standard line-imaging mode. In the 3-D mode, the exposure signal is activated only once at the beginning of each of the 96 line integration period. In the normal 2-D line-imaging mode the exposure signal is activated once for every one of the integration cycles. The exposure signal output is thus used to control the pulsing of the projector and can also be used to control a shutter mechanism if one is used. The line read signal is used to control the activation of a single integration cycle and causes the camera to output a line array of image data. The 3-D mode exposure control programmable line framesize counter/divider is used to set the number of integration lines to be used in the 3-D mode of operation of the sensor. The framesize cannot be set greater than the number of actual integration lines of the TDI device. A partial scanning of integration lines can effectively be accomplished by setting this counter to a number that is less than the number of integration lines of the TDI device. Partial scanning will allow the sensor to output 3-D profiles at a higher rate than with full scanning, but the range (depth) of operation of the sensor will be correspondingly reduced. When partial scanning is implemented, it is also possible to control the offset position of the zone of integration lines to be used on the TDI array using the programmable offset line counter. This line counter needs to be reset only once at the very beginning of the initial system sequence. For example, if one wants to use only the central 48 lines of the 96 line TDI array, one needs to set the framesize counter to 48 and the line offset counter to 24 (in practice, the number is set to cause the counter to overflow after 24 counts).

The 3-D mode, partial scanning and offset parameters can either be fixed or dynamically modified by the processor depending on the results and image parameters outputted from the sensor or simply set or modified by an operator. Finally, if the object to be measured moves at a constant and known speed, it is not absolutely necessary to use a displacement-measuring device. Line read signals can then be generated at a fixed frequency (or time interval) with no need for an encoder.

In accordance with another aspect thereof, the present invention also concerns a method for measuring by triangulation a range to a target object extending in an exposition area using a TDI device. The method includes the following steps of:

a) generating a light beam, and projecting this light beam towards the exposition area for reflection on the target object;

b) disposing a plurality of detector arrays, which define the TDI device, contiguously in a linear sequence. The TDI device is positioned to detect the reflection of the light beam on the target object within the exposition area across a plurality of the photodetector arrays. The TDI device has, in operation, an acquisition cycle composed of a number of integration periods, each photodetector array accumulating electronic charges representative of light incident thereon during each integration period. Each of the photodetector arrays transfers all electronic charges therein to a next photodetector array along the linear sequence after each integration period. The TDI device has an output for transmitting all electronic charges from a last photodetector array along the linear sequence after each integration period;

c) restricting an exposition of the TDI device to the reflection of the light beam on the target object to a selected integration period of the exposition cycle. Preferably, this step is done by:

i) pulsing the light beam into a light pulse having a duration of one integration period; and ii) synchronizing this light pulse with the selected integration period of the acquisition cycle.

The method finally includes a last step of:

d) receiving the electronic charges from the output of the TDI device after each integration period of the acquisition cycle, and processing the electronic charges of the acquisition cycle to obtain therefrom the range to the target object.

For industrial applications, the present invention preferably provides a method for measuring by triangulation a range to a target object over a plurality of regions thereof using a TDI device, which includes the following step:

a) generating a light beam and projecting the same towards an exposition area;

b) successively positioning each of the regions of said target object within the exposition area. Preferably, a sub-step of monitoring the positioning of each regions of the target object within the exposition area, and synchronizing the selected integration period of each acquisition cycle therewith, is also performed;

c) disposing a plurality of detector arrays, defining the TDI device, contiguously in a linear sequence, the TDI device being positioned to detect the reflection of the light beam on the region of the target object within the exposition area across a plurality of the photodetector arrays. The TDI device has, in operation, a plurality of acquisition cycles each composed of a number of integration periods. Each photodetector array accumulates electronic charges representative of light incident thereon during each integration period, and transfers all electronic charges therein to a next photodetector array along the linear sequence after each integration period. The TDI device has an output for transmitting all electronic charges from a last photodetector array along the linear sequence after each integration period of each acquisition cycle.

d) restricting an exposition of the TDI device to the reflection of the light beam on each region of the target object to a selected integration period of a corresponding acquisition cycle; Preferably, this is realized by
  i) pulsing the light beam into light pulses each having a duration of one integration period; and
  ii) synchronizing each light pulse with the selected integration period of one of the acquisition cycles; and e) receiving the electronic charges from the output of the TDI device after each integration period of each acquisition cycle and processing the electronic charges each of the acquisition cycle to obtain therefrom the range to the corresponding region of the target object.

As previously mentioned, the use of a TDI device in the place of matrix type photodetector arrays as detection means for 3-D triangulation based sensors allows performance gains. In particular, it allows a high number of 3D points per profile combined with a high profile rate. Using relatively inexpensive and standard commercially available TDI devices in accordance with the present invention, it is possible to obtain a 3-D profile of 2048 points at a rate of 864 Hz. and using the partial scanning technique described below, 2048 points at a rate of 1,728 Hz can be achieved.

Of course, various modifications could be made to the embodiments described above without departing from the scope of the invention as described in the appended claims.

What is claimed is:

1. A sensor for measuring a range to a target object by triangulation using a TDI device, comprising:

a light source generating a light beam for projection towards the target object and for reflection thereon positioned along a short axis of said TDI device;

a plurality of photodetector arrays disposed contiguously in a linear sequence and defining the TDI device, said TDI device being positioned to detect the reflection of the light beam on the target object across a plurality of said photodetector arrays, said TDI device being operable over an acquisition cycle composed of a number of integration periods, each photodetector array accumulating electronic charges representative of light incident thereon during each integration period, each of said photodetector arrays transferring all electronic charges therein to a next photodetector array along said linear sequence after each integration period, said TDI device having an output for transmitting all electronic charges from a last photodetector array along said linear sequence after each integration period;

restricting means for restricting an exposition of the TDI device to the reflection of the light beam on the target object to a single integration period of the acquisition cycle; and processing means for receiving the electronic charges from the output of the TDI device after each integration period of the acquisition cycle and processing the electronic charges of the acquisition cycle to obtain therefrom the range to the target object.

2. The sensor according to claim 1, wherein the restricting means comprise:

a pulse generator pulsing the light beam into a light pulse having a duration of one integration period; and a synchronizing circuit synchronizing said light pulse with the single integration period of the acquisition cycle.

3. The sensor according to claim 1, wherein said single integration period is a first integration period of the acquisition cycle.

4. The sensor according to claim 1, wherein the light source is a uniform intensity laser line projector, the light beam therefore being line-shaped.

5. The sensor according to claim 1, wherein each photodetector array is a line photodetector extending generally perpendicular to the linear sequence.

6. The sensor according to claim 5, wherein the TDI device comprises 96 photodetector arrays.

7. The sensor according to claim 6, wherein each photodetector array has 2048 pixels.

8. A sensing apparatus for measuring a range to a target object over a plurality of regions thereof by triangulation using a TDI device, comprising:

a light source generating a light beam for projection towards an exposition area positioned along a short axis of said TDI;

positioning means for successively positioning each of the regions of said target object within the exposition area;

a plurality of photodetector arrays disposed contiguously in a linear sequence and defining the TDI device, said TDI device being positioned to detect the reflection of the light beam on a region of the target object extending in the exposition area across a plurality of said photodetector arrays, said TDI device being operable over a plurality of acquisition cycle each composed of a number of integration periods, each photodetector array accumulating electronic charges representative of light incident thereon during each integration period, each of said photodetector arrays transferring all electronic charges therein to a next photodetector array along said linear sequence after each integration period, said TDI device having an output for transmitting all electronic charges from a last photodetector array along said linear sequence after each integration period;

restricting means for restricting an exposition of the TDI device to the reflection of the light beam on each region of the target object to a single integration period of each acquisition cycle; and processing means for receiving the electronic charges from the output of the TDI device after each integration period of each acquisition cycle and processing the electronic charges of each acquisition cycle to obtain therefrom the range to the region of the target object during the selected integration period of said acquisition cycle.

9. A sensing apparatus according to claim 8, further comprising an optical encoder monitoring the moving of the target object, said optical encoder being coupled to the TDI device for synchronizing the single integration period of each acquisition cycle with the positioning of one of the regions of the target object within the exposition area.

10. The sensing apparatus according to claim 8, wherein the restricting means comprise:

a pulse generator pulsing the light beam into light pulses each having a duration of one integration period; and a synchronizing circuit synchronizing each light pulse with the single integration period of one of the acquisition cycles.

11. A method for measuring by triangulation a range to a target object extending in an exposition area using a TDI device, comprising the steps of:

a) generating a light beam, and projecting said light beam towards the exposition area for reflection on the target object said light beam being positioned along a short axis of said TDI;

b) disposing a plurality of detector arrays, defining said TDI device, contiguously in a linear sequence, said TDI device being positioned to detect the reflection of the light beam on the target object within the exposition area across a plurality of the photodetector arrays, said TDI device having, in operation, an acquisition cycle composed of a number of integration periods, each photodetector array accumulating electronic charges representative of light incident thereon during each integration period, each of said photodetector arrays transferring all electronic charges therein to a next photodetector array along said linear sequence after each integration period, said TDI device having an output for transmitting all electronic charges from a last photodetector array along said linear sequence after each integration period;

c) restricting an exposition of the TDI device to the reflection of the light beam on the target object to a single integration period of the exposition cycle; and d) receiving the electronic charges from the output of the TDI device after each integration period of the acquisition cycle and processing the electronic charges of the acquisition cycle to obtain therefrom the range to the target object.

12. The method according to claim 11, wherein step c) comprises the sub-steps of:

i) pulsing the light beam into a light pulse having a duration of one integration period; and ii) synchronizing said light pulse with the single integration period of the acquisition cycle.

13. A method for measuring by triangulation a range to a target object over a plurality of regions thereof using a TDI device, comprising the steps of:

a) generating a light beam and projecting the same towards an exposition area said light beam being positioned along a short axis of said TDI;

b) successively positioning each of the regions of said target object within the exposition area;

c) disposing a plurality of detector arrays, defining said TDI device, contiguously in a linear sequence, said TDI device being positioned to detect the reflection of the light beam on the region of the target object within the exposition area across a plurality of the photodetector arrays, said TDI device having, in operation, a plurality of acquisition cycles each composed of a number of integration periods, each photodetector array accumulating electronic charges representative of light incident thereon during each integration period, each of said photodetector arrays transferring all electronic charges therein to a next photodetector array along said linear sequence after each integration period, said TDI device having an output for transmitting all electronic charges from a last photodetector array along said linear sequence after each integration period of each acquisition cycle;

d) restricting an exposition of the TDI device to the reflection of the light beam on each region of the target object to a single integration period of a corresponding acquisition cycle; and e) receiving the electronic charges from the output of the TDI device after each integration period of each acquisition cycle and processing the electronic charges each of the acquisition cycle to obtain therefrom the range to the corresponding region of the target object.

14. The method according to claim 13, wherein step b) comprises a sub-step of monitoring the positioning of each regions of the target object within the exposition area, and synchronizing the selected integration period of each acquisition cycle therewith.

15. The method according to claim 13, wherein step d) comprises the sub-steps of:

i) pulsing the light beam into light pulses each having a duration of one integration period; and ii) synchronizing each light pulse with the single integration period of one of the acquisition cycles.

* * * * *